DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 10

T903,026

DIRECT-POSITIVE SILVER HALIDE EMULSIONS CONTAINING SUBSTITUTED PHENYLAZO-1,2,3-ALPHA, 7-TETRAZAINDENE COMPOUNDS

Cynthia Geer Ulbing, Fairport, and Dorothy Johnson Beavers, Rochester, N.Y. (both % Eastman Kodak Co., Kodak Park Division, Rochester, N.Y. 14650)

Filed Mar. 10, 1972, Ser. No. 233,758

Int. Cl. G03c *1/28*

U.S. Cl. 96—107

No Drawing. 12 Pages Specification

Direct-positive silver halide emulsions and photographic elements containing said emulsions are disclosed wherein the emulsion contains a substituted phenylazotetrazaindene compound. In one aspect, the tetrazaindene compounds which are used in direct-positive emulsions have the formula:

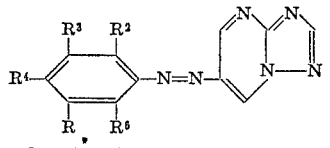

wherein $R^2$, $R^3$, $R^4$, $R^5$ and $R^6$ can each be hydrogen atoms, alkyl groups, nitro groups, halogen atoms, alkyloxy groups or alkylthio groups. The phenylazotetrazaindene compounds can be incorporated in fogged, silver halide emulsions such as, for example, emulsions disclosed in U.S. Pats. 3,367,778 by Berriman, 3,501,307 by Illingsworth, and the like. In one aspect, good image properties are obtained upon exposure and development of direct-positive emulsions containing the phenylazotetrazaindene compounds at concentrations of from 10 mg. to 2 g. per mole of silver.